United States Patent
Jain et al.

(10) Patent No.: US 12,332,862 B2
(45) Date of Patent: *Jun. 17, 2025

(54) DATA FILE CLUSTERING WITH KD-EPSILON TREES

(71) Applicant: Databricks, Inc., San Francisco, CA (US)

(72) Inventors: Prakhar Jain, Sunnyvale, CA (US); Frederick Ryan Johnson, Otem, UT (US); Bart Samwel, Oegstgeest (NL)

(73) Assignee: Databricks, Inc., San Francisco, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 18/218,766

(22) Filed: Jul. 6, 2023

(65) Prior Publication Data
US 2025/0013619 A1  Jan. 9, 2025

Related U.S. Application Data

(63) Continuation of application No. 18/218,400, filed on Jul. 5, 2023, now Pat. No. 12,072,863.

(51) Int. Cl.
*G06F 16/20* (2019.01)
*G06F 16/22* (2019.01)
(Continued)

(52) U.S. Cl.
CPC ...... *G06F 16/2246* (2019.01); *G06F 16/2358* (2019.01); *G06F 16/245* (2019.01); *G06F 16/2453* (2019.01); *G06F 16/285* (2019.01)

(58) Field of Classification Search
CPC ............ G06F 16/2246; G06F 16/2358; G06F 16/245; G06F 16/2453; G06F 16/285
See application file for complete search history.

(56) References Cited

U.S. PATENT DOCUMENTS 8,463,825 B1 *  6/2013  Harty .................... G06F 16/188
                                                        711/100
10,769,130 B1 *  9/2020  Armbrust ............ G06F 16/2282
(Continued)

OTHER PUBLICATIONS

Article entitled "What is a Lakehouse", by Lorica et al., dated Jan. 30, 2020 (Year: 2020).*
(Continued)

*Primary Examiner* — Mahesh H Dwivedi
(74) *Attorney, Agent, or Firm* — Fenwick & West LLP

(57) ABSTRACT

A data tree for managing data files of a data table and performing one or more transaction operations to the data table is described. The data tree is configured as a KD-epsilon tree and includes a plurality of nodes and edges. A node of the data tree may represent a splitting condition with respect to key-values for a respective key. A leaf node of the data tree may correspond to a data file for a data table that includes a subset of records having key-values that satisfy the condition for the node and conditions associated with parent nodes of the node. A parent node may correspond to a file including a buffer that stores changes to data files reachable by this parent node, and also includes dedicated storage to pointers of the child nodes. By using the data tree, the data processing system may efficiently cluster the data in the data table while reducing the number of data files that are rewritten.

20 Claims, 10 Drawing Sheets

(51) Int. Cl.
    *G06F 16/23*     (2019.01)
    *G06F 16/245*     (2019.01)
    *G06F 16/2453*     (2019.01)
    *G06F 16/28*     (2019.01)

(56) References Cited

U.S. PATENT DOCUMENTS

| | | | |
|---|---|---|---|
| 10,845,991 B2 * | 11/2020 | Danilov | G06F 3/0679 |
| 2009/0300533 A1 | 12/2009 | Williamson | |
| 2018/0137224 A1 | 5/2018 | Hemmer et al. | |
| 2018/0285002 A1 * | 10/2018 | Hayasaka | G06F 12/0811 |
| 2020/0334272 A1 * | 10/2020 | Hrastnik | G06F 16/245 |
| 2021/0004296 A1 * | 1/2021 | Gupta | G06F 11/1451 |
| 2021/0232604 A1 | 7/2021 | Sundaram et al. | |
| 2022/0309104 A1 | 9/2022 | Armbrust et al. | |
| 2022/0374532 A1 * | 11/2022 | Zaharia | G06F 3/0637 |
| 2023/0259518 A1 | 8/2023 | Renick | |
| 2023/0359602 A1 | 11/2023 | Samwel et al. | |
| 2023/0385265 A1 | 11/2023 | Karamanolis et al. | |
| 2024/0061840 A1 | 2/2024 | Menon et al. | |

OTHER PUBLICATIONS

Article entitled "Comparison of Data Lake Table Formats (Apace Iceberg, Apache Hudi and Delta Lake", by Merced, dated Aug. 7, 2023 (Year: 2023).*

Wavicle Data Solutions, "The Snowflake vs Databricks Breakdown," 2021, 10 pages, Retrieved from the internet <URL:chrome-extension://efaidnbmnnnibpcajpcglclefindmkaj/https://wavicledata.com/wp-content/uploads/2022/01/DatabricksAndSnowflake_PDF_Guide_R5.pdf >.

* cited by examiner

DATA FILE CLUSTERING WITH KD-EPSILON TREES

CROSS REFERENCE TO RELATED APPLICATIONS

This application is a continuation of U.S. patent application Ser. No. 18/218,400, titled "Data Ingestion Using Data File Clustering With KD-Epsilon Trees," filed on Jul. 5, 2023, which is incorporated herein by reference in its entirety.

TECHNICAL FIELD

This disclosure relates generally to data storage technologies, and more particularly to clustering data files for a data table.

BACKGROUND

A data processing service may manage a significant amount of data for one or more entities in various forms, such as raw data or data tables. A data table may include a plurality of records or instances, where each record includes values for one or more features. The data processing service may manage data tables with many records as one or more data files, in which a data file includes a respective subset of records of a data table. Thus, the data processing service may manage large file repositories. Moreover, the data processing service may receive requests from users to perform one or more transaction operations on a data table that include, for example, read or write operations. For example, a user (e.g., data analyst) associated with an entity may request that the data processing service modify a data table to include a new set of records for the entity.

In some instances, the data processing service performs a clustering process to change the layout of the data or change the distribution of the data with respect to one or more key-values, such that records with similar key-values are collocated in the same data file. A key-value is a value for a key feature in the data table (e.g., date column). In this manner, when performing read operations that are only relevant to records with certain key-values in the data table, the data processing service can skip data files that do not have relevant key-values, saving computing resources. However, managing a significant number of clustered data files can be difficult as often, many data files have to be rewritten to incorporate new or modified data into the data table, for example, when the new or modified data has a relatively uniform distribution with respect to the key-values. This results in significant delay in completing the transaction operation on cloud storage systems.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (computer-readable medium or method) for purposes of illustration only. One skilled in the art will readily recognize from the following description that alternative embodiments of the structures and methods illustrated herein may be employed without departing from the principles described herein.

OVERVIEW

The disclosed configurations provide a method (and/or a computer-readable medium or system) for generating a data tree for managing data files of a data table and performing one or more transaction operations to the data table based on the data tree. In some embodiments, a data tree for a data table is configured as a KD-epsilon tree and includes a plurality of nodes and edges. A node of the data tree may represent a splitting condition with respect to key-values for a respective key. A leaf node of the data tree may correspond to a data file of the data tree that includes a subset of records having key-values that satisfy the condition for the node and conditions associated with parent nodes of the node. A parent node of the data tree is a node that has one or more child nodes below it. A parent node may also correspond to a file that includes a buffer for storing changes (e.g., add, update, delete) to the data table and also dedicated storage for storing metadata including pointers to child nodes of the parent node and fence keys defining the child nodes of the node. By using the data tree, the data processing service 102 may efficiently cluster the data in the data table while reducing the number of data files that are rewritten when data is modified or added to the data table.

Figure 1A:
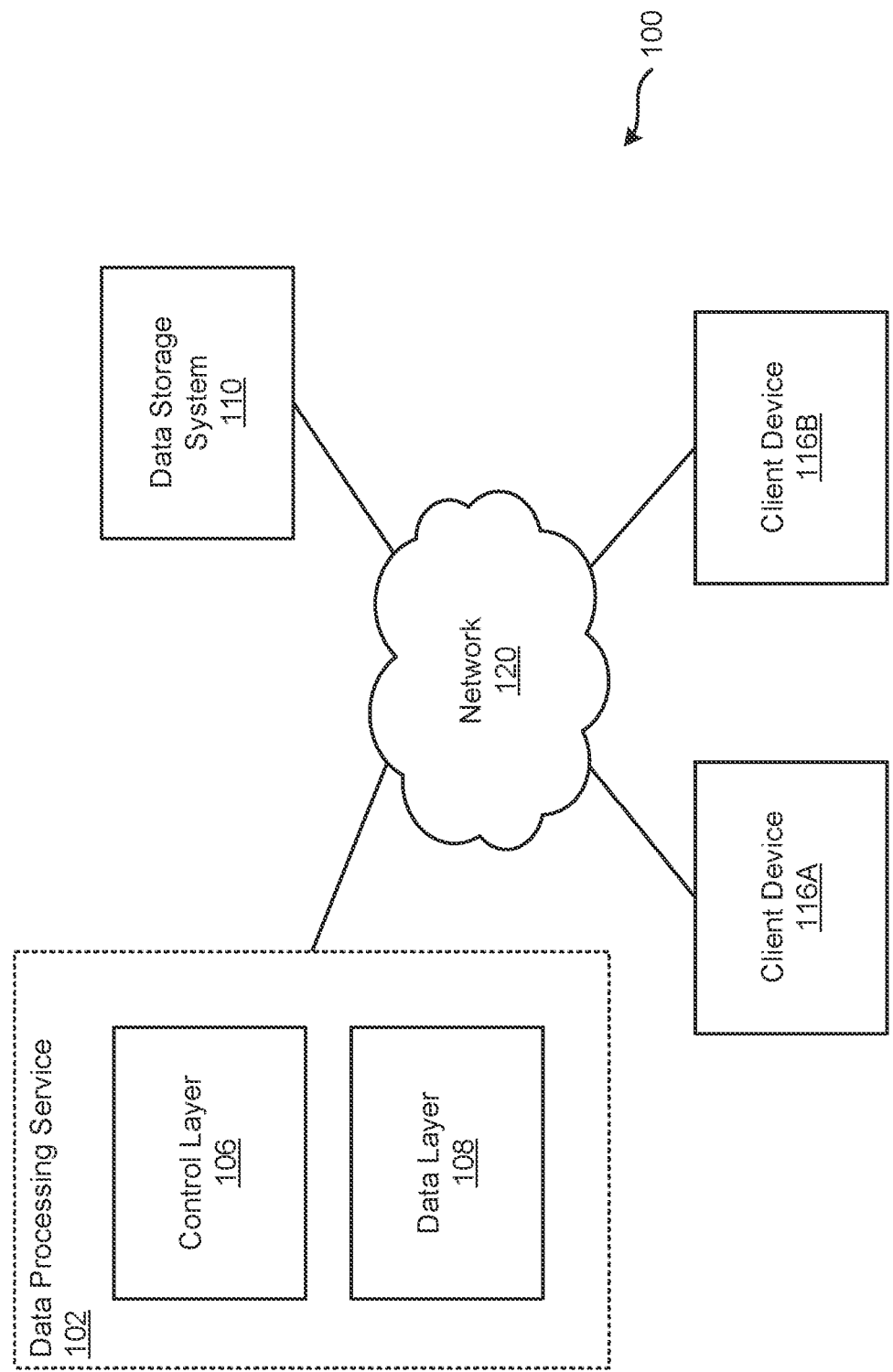
FIG. 1A is a high-level block diagram of a system environment for a data processing system, in accordance with an embodiment.

FIG. 1A is a high-level block diagram of a system environment 100 for a data processing service 102, in accordance with an embodiment. The system environment 100 shown by FIG. 1 includes one or more client devices, e.g., 116A, 116B (generally 116), a network 120, a data processing service 102, and a data storage system 110. In alternative configurations, different and/or additional components may be included in the system environment 100.

The data processing service 102 is a service for managing and coordinating data processing services to users of client devices 116. The data processing service 102 may manage one or more applications that users of client devices 116 can use to communicate with the data processing service 102. Through an application of the data processing service 102, the data processing service 102 may receive requests from users of client devices 116 to perform one or more data processing functionalities on data stored, for example, in the data storage system 110. The requests may include query requests, analytics requests, or machine learning and artificial intelligence requests, on data stored in the data storage system 110. The data processing service 102 may provide responses to the requests to the users of the client devices 116 after they have been processed.

In one embodiment, as shown in the system environment 100 of FIG. 1A, the data processing service 102 includes a control layer 106 and a data layer 108. The components of the data processing service 102 may be configured on one or more servers and/or a cloud infrastructure platform. In one embodiment, the control layer 106 receives data processing requests and coordinates with the data layer 108 to process the requests received from the client devices 116. The control layer 106 may schedule one or more jobs related to a request or receive requests to execute one or more jobs from the user directly through a respective client device 116. The control layer 106 may distribute the jobs to components of the data layer 108 where the jobs are executed.

As described in detail below, in one embodiment, the control layer 106 provides a method by which a data tree for managing data files of a data table is generated, and one or more transaction operations to the data table are performed based on the data tree. In one embodiment, the control layer 106 receives, from a client device 116, a request to ingest a set of records to a data table stored in the data storage system 110. The data table may include a plurality of records for one or more features. The control layer 106 accesses a data tree for the data table that includes a plurality of nodes and edges. The nodes of the data tree represent conditions with respect to key-values for a set of keys.

In one embodiment, a node of the data tree is configured as a file. Specifically, the leaf nodes of the data tree are each configured as a data file that make up the data table. A data file (corresponding to a respective leaf node) includes a subset of records having key-values satisfying the condition for the leaf node and conditions associated with parent nodes of the leaf node. A non-leaf node, or a parent node, of the data tree is also configured as a file. In one embodiment, a file that is a parent node in the data tree is a metadata node and includes an amount of storage dedicated to storing pointers to child nodes in the data tree as well as fence keys defining the bounding boxes of the child nodes, and a buffer used for buffering data changes (e.g., additions, updates, deletions to records) to data files that are reachable (i.e., that are child nodes) through the parent node. Moreover, a node and the file representing the node in the data tree is also associated with an upper bound on file size that indicates an amount of data storage dedicated to the file.

Figure 1B:
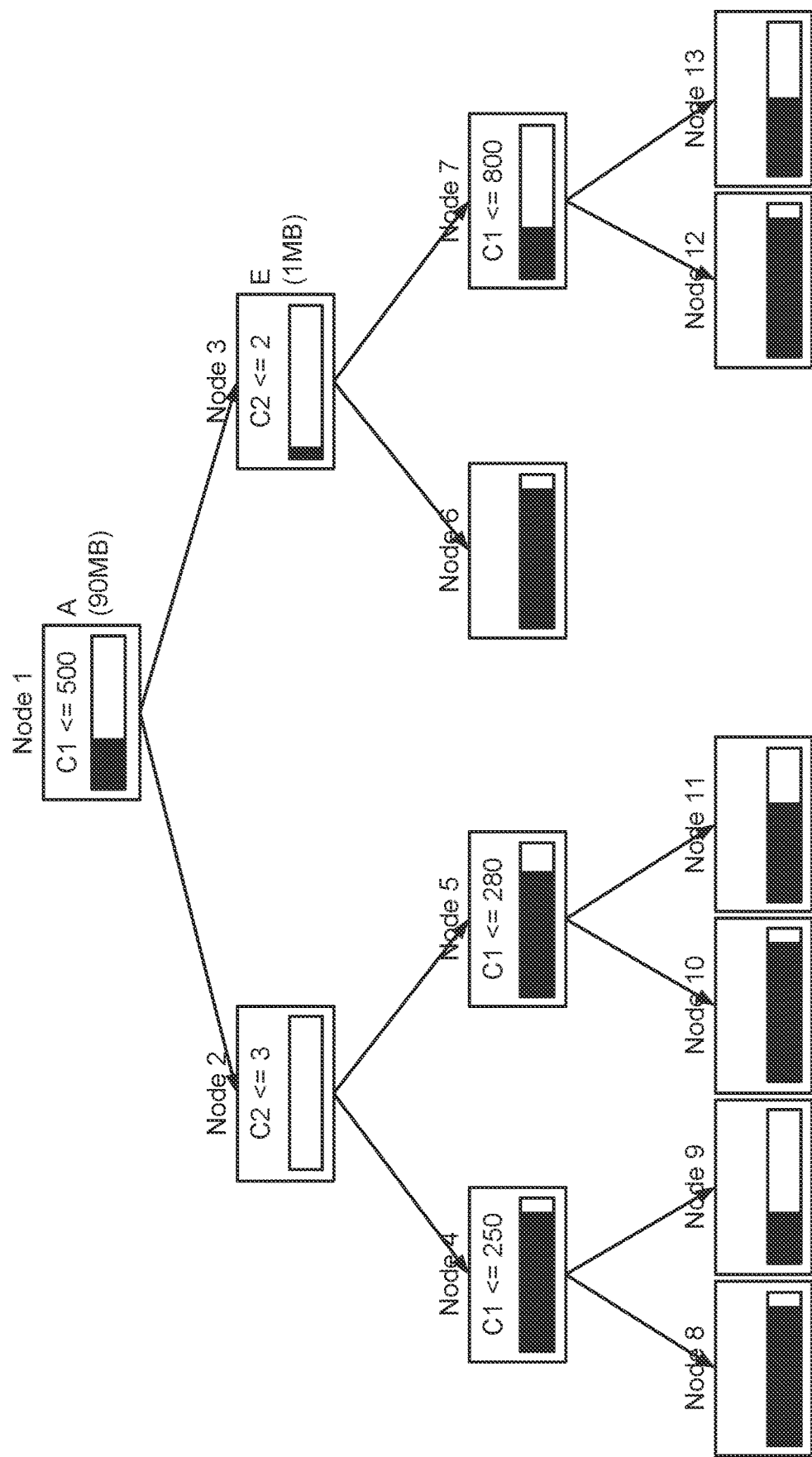
FIG. 1B illustrates an exemplary embodiment of a KD-epsilon tree, in accordance with an embodiment.

FIG. 1B illustrates a KD-epsilon tree, in accordance with an embodiment. The data tree may be stored in conjunction with the data files of the data table. As illustrated in FIG. 1B, the example data tree includes a root node, one or more intermediate nodes, and one or more leaf nodes. Each node of the data tree is a file, and is associated with an upper bound on file size that indicates how much data storage is dedicated to the respective node (visually indicated by the length of the rectangle within each node shown in FIG. 1B), and how much data has been stored for that node (visually indicated by how much of each rectangle is shaded in FIG. 1B). In the data tree of FIG. 1B, each node in the data tree may be associated with 256 MB of data storage in the data storage system 110. For example, 90 MB of data is stored in association with the root node (Node 1) in data file A. As another example, 1 MB of data is stored in association with the parent node Node 3 in file E. As another example, a data table with 1PB of data with a 64 MB target file size would generate approximately 22M leaf nodes (terminating nodes or nodes without child nodes) and approximately 2M parent (non-leaf) nodes spread across six in-node layers of the data tree.

In one embodiment, the nodes of the data tree represent conditions with respect to key-values for two or more keys. For example, in the example data tree of FIG. 1B, the nodes of the data tree may alternate between splitting the data of a respective data table with respect to key-values for a first key (e.g., values for feature "C1") at one level of the data tree, and a second key (e.g., values for feature "C2") at the next level of the data tree, and this ordering may be repeated for remaining levels throughout the depth of the data tree.

In one embodiment, each node that is a parent node also stores one or more fence keys for defining and successively refining the multi-dimensional bounding boxes of the child nodes of the node, in which the first fence key defines the bounding boxes of the leftmost child node, the next fence key defines the bounding boxes for the next child node, and so on. For example, data with all ranges for the set of keys C1 and C2 can be included in the files of root node (Node 1). Since the root node (Node 1) is associated with fence key $C1 \Leftarrow 500$ defining the bounding box of the leftmost child node (Node 2) and the rightmost child node (Node 3) is associated with the remaining key range of $C1>500$. Thus, data with key-values of $C1 \Leftarrow 500$ can be included in the files of Node 2, and data with key-values of $C1>500$ can be included in the files of Node 3. As another example, Node 2 in turn stores fence key $C2 \Leftarrow 3$, defining the bounding box of the leftmost child node (Node 4) and the rightmost child node (Node 5) associated with remaining key range $C2>3$.

The data table may be composed of data files represented by leaf nodes Node 8, Node 9, Node 10, Node 11, Node 12, and Node 13 of the data tree. Thus, in one embodiment, the leaf nodes do not store fence keys or pointers to child nodes since there are no child nodes for leaf nodes. The buffer in a file of a parent node stores changes to data files that are reachable through the parent node. For example, the buffer in Node 5 may store changes (e.g., new records to be added, deleted, or updated) to records in data files represented by Node 10 or Node 11.

In one embodiment, the data tree described herein is configured as a binary tree, where each node has two child nodes. However, it is appreciated that in other embodiments, a node may have any number of child nodes and can be configured as a non-binary tree. Specifically, the data tree can be configured as an epsilon tree with ε as a tunable parameter, B as a node size, and N as data size. The data tree has desirable algorithmic properties of an epsilon tree including bounded write amplification while preserving $O(\log_B^\varepsilon N)$ tree height because its fanout is a function of the node size B and/or the branching factor $B^\varepsilon$, not any arbitrary constant value. Specifically, $\varepsilon$ is the exponential fraction of a node's fanout, with the remaining storage space in the node repurposed as a buffer to store changes to data files represented by the leaf nodes. For example, a regular B-tree using 16 MB nodes could approximately have B=2e5 bytes, but a B-epsilon tree with $\varepsilon=\frac{1}{3}$ would have fanout of $2e5^{1/3}=58$. The 58 child pointers would occupy approximately 4,600 bytes of data in a file of a parent node, while the remaining 15.995 MB is used as a buffer to store changes. As another example, if B=12,500 bytes, the fanout would be $12500^{1/3}=23$.

Therefore, the value of $\varepsilon$ (in the range of $0<\varepsilon<1$) can be used to control the read and write tradeoff, in that higher values of $\varepsilon$ result in fewer tree levels but high write amplification, while lower values of $\varepsilon$ favor writers (relatively tall tree but low write amplification). Thus, to favor faster read operations, the data processing service 102 may configure the data tree with high values of epsilon (above a predetermined threshold), and to favor faster write operations, the data processing service 102 may configure the data tree with lower values of epsilon (below a predetermined threshold). In one instance, $\varepsilon$ may be in a range between ½ and ⅓ to balance both read and write operations to files of the data tree.

Thus, data files for a respective node include records with a narrower range of key-values compared to those of a parent node, since a greater number of splitting conditions are imposed on the node compared to the parent node. In other words, within a space defined based on the keys for the data tree, the key-values of data files associated with a respective node are bounded based on the splitting condition for the node and conditions associated with a parent node of the node. Thus, the bounding box for the respective node is always smaller than a bounding box for a parent node, and therefore, the records for the respective node may be clustered at a higher degree than the records for the parent node. In other words, the data in files of a parent node may have a wider range of key-values for the set of keys than data in files of a respective child node, and the files may have varying levels of clustering throughout the depth of the data tree.

Therefore, for a read operation for a given range of key-values, the data processing service 102 may traverse through the data KD-epsilon tree, by sequentially loading the nodes, starting from the root node in memory, using the metadata for each node to identify the relevant child nodes for the next step, and continue following parent-child paths until leaf nodes overlapping the range of key-values are reached. In the process of doing so, the read operation should apply matching changes (e.g., buffered deltas) to records in the scanned leaf nodes to avoid returning stale results, where recent changes are stored in shallowest nodes and override changes at deeper levels of the tree. The data processing service 102 reads only those data files that are associated with these leaf nodes and parent nodes in the traversed path, and can skip reading the remainder of the data files. Therefore, a data tree configured as a KD-epsilon tree may support data skipping because each intermediate node (including the root node) tracks the bounding boxes or splitting conditions of its child nodes. In this manner, traversal into subtrees of the data tree with non-relevant conditions can be avoided during a read operation.

In one embodiment, the data processing service 102 receives requests to ingest a set of records to the data table. These may be additional records added to the data table, updates to existing records of the data table, and/or deletion of records to the data table. The control layer 106 determines if one or more parent nodes of the data tree have sufficient data storage in the buffer to store the set of records of the request. Responsive to determining that a parent node has sufficient data storage, the control layer 106 requests writing the set of records to the file associated with the parent node. For example, in the data tree of FIG. 1B, the control layer 106 may request the set of records be written to the file associated with the root node (Node 1) or any of the other parent nodes. Responsive to determining that there is insufficient buffer storage, the control layer 106 requests writing at least a portion of the set of records or records in the files of the parent node to at least one file associated with one or more child nodes of the parent node. A more detailed description of this spillover scenario is described below.

Specifically, when the data tree structure is configured such that data files are only associated with leaf nodes of the data tree, this may result in a higher degree of data skipping for a read operation as the data files for each leaf node may be clustered within a relatively narrow range with respect to the set of keys for the data tree, and only those data files associated with leaf nodes that overlap with the particular key-value range have to be read. However, when a set of records that have a relatively uniform distribution with respect to the set of keys are written to the data table, a significant number of data files may need to be rewritten since all data files overlapping with the range of key-values have to be modified and each data file may correspond to a relatively narrow range of key-values. When the data files are stored on cloud storage as objects, this process can result in significant delay, since some cloud storage objects are immutable and data files have to be rewritten to accommodate minor or major modifications to the data.

However, by maintaining a data tree structure that allows various levels of clustering through dedicating buffers for files for even the root node and the parent nodes, the data processing service 102 may write the set of records to a smaller number of files of one or more parent nodes without having to rewrite a large number of data files for the leaf nodes. For example, while ingesting 100,000 records may result in rewriting 1,000 data files when only data files are dedicated to the leaf nodes of the data tree, only one data file might have to be rewritten by simply storing the 100,000 records in the buffer for the root node. This can be advantageous when not a lot of computing resources are available in the data layer 108 at a given point in time. Moreover, while the data processing service 102 may retrieve a greater number of data files including data files for leaf nodes and any parent nodes of the leaf nodes for a given read operation, the amount of data to be read is bounded by the depth of the data tree and the amount of data for each node, which may not significantly increase the read time.

By maintaining data files of a data table according to the data tree described herein, the data processing service 102 can balance latency with searchability for any source of latency, whether the source of the latency is I/O costs on cloud storage, RAM access in a processor, etc., with node size depending on bandwidth and latency of the targeted storage device. For cloud storage, bandwidth of a single GET request is approximately ~50 MB/s while latency to first byte is approximately ~100 ms, so a node size of ~5 MB might be indicated to balance 100 ms latency with subsequent 100 ms transfer. The data processing service 102 designs the nodes of the data tree to balance latency with searchability as appropriate.

As described above, a parent node in the KD-epsilon tree may include dedicated storage for metadata in addition to storing changes in a buffer. Therefore, in one embodiment, data and metadata for the data table may be tracked in the same file structure using the same KD-epsilon tree. In other words, the parent nodes of the KD-epsilon tree may correspond to a metadata tree in that a parent node as a metadata node includes metadata or descriptors of the next level of child nodes in the epsilon tree.

When data files for a data table are randomly distributed across the set of metadata files in existing systems, most or all metadata files are read to identify the relevant data files for a read operation with a particular key-value range. When the data table is very large, this process alone can result in significant delay even though the data files themselves might be clustered nicely. Moreover, while data skipping can occur with data trees, the parent node to child node traversals can add latency because data associated with the child nodes of a parent node cannot be retrieved until the parent node itself has been retrieved in cases where buffers of the parent node store pointers to the child nodes.

Thus, in one embodiment, the data processing service 102 reads the list of metadata nodes that correspond to the list of parent nodes of the KD-epsilon tree from storage (e.g., cloud object storage), and stores the list of parent nodes in memory. In this manner, the data processing service 102 can read nodes from upper levels of the KD-epsilon tree at once during startup and store them in memory. When traversals of the KD-epsilon tree are executed later for a read operation, the data processing service 102 only pays a potential cache miss on the deepest parent nodes and leaf nodes of the tree that were not loaded in memory and are retrieved separately. In particular, even for a significantly large table backed by approximately 1e9 files, the corresponding KD-epsilon tree may include approximately 35,000 parent nodes of approximately 10 MB size each. The list of node file names would occupy approximately 3-5 MB and the contents of those nodes would occupy approximately 350 GB.

Thus, while a significant amount of memory may be required to prefetch the entire set of nodes of a KD-epsilon tree, the files corresponding to nodes at upper levels of the tree could easily be prefetched and stored in cache memory having a size of approximately 12 GB, since each level may have approximately 30× fewer nodes than the level below it. For example, the data processing service 102 may prefetch the root node and parent nodes except the leaf nodes and the parent nodes at the lowest level of a KD-epsilon tree.

Figure 1C:
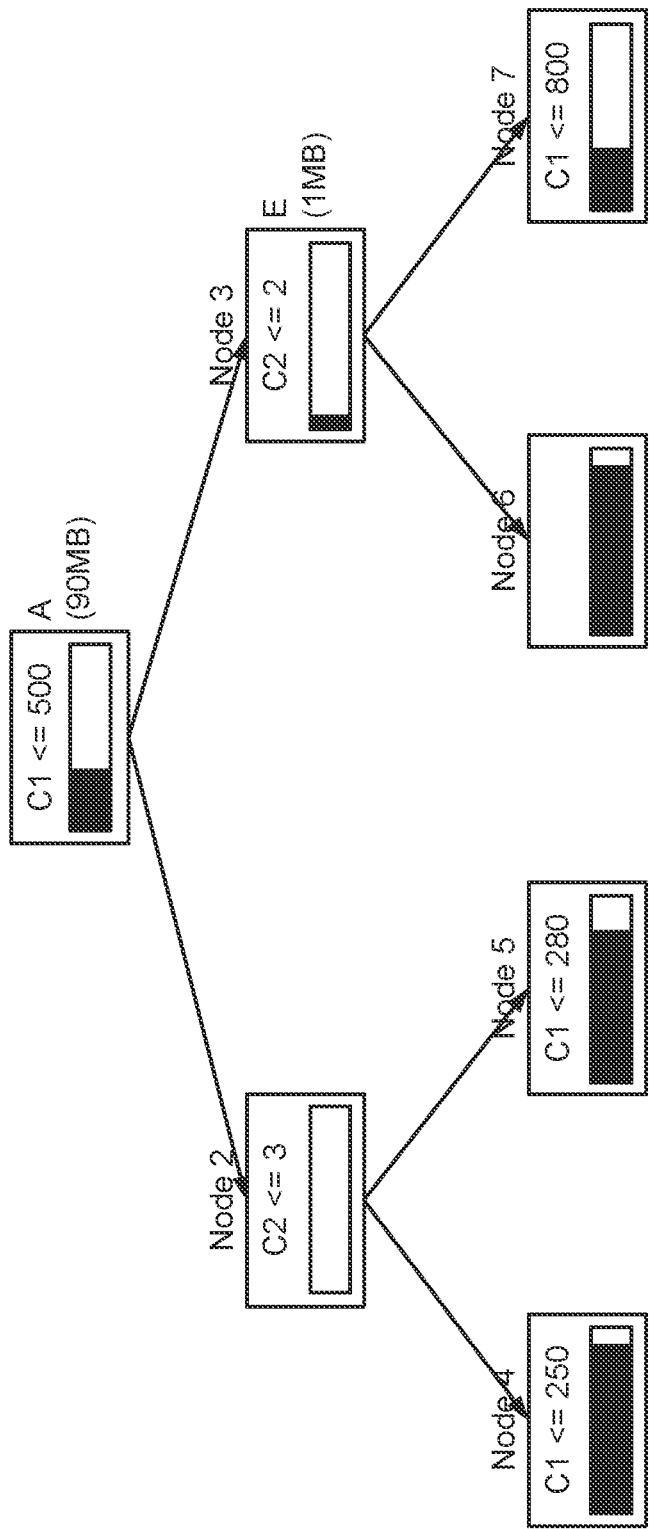
FIG. 1C illustrates an exemplary embodiment of a metadata KD-epsilon tree, in accordance with an embodiment.

FIG. 1C illustrates an exemplary embodiment of a metadata tree retrieved and stored in memory, in accordance with an embodiment. In one embodiment, nodes of the metadata tree corresponds to one or more parent nodes of the data tree. As illustrated in FIG. 1C, the example metadata tree includes the root node of the data tree, Nodes 2, 4, and 5 of the data tree, and Nodes 8 and 9 of the data tree, without the leaf nodes of the KD-epsilon tree. While FIG. 1C illustrates a tree with a relatively small number of nodes, as another example, a node in the metadata tree may hold metadata for approximately 30K nodes in the data tree, and the metadata tree for the 1PB data example may include approximately 1,200 nodes.

In particular, the metadata associated with a node of the metadata tree includes metadata information on files associated with the child nodes of the data tree. For example, the root node Node 1 of the metadata tree may include metadata information that are data node descriptors for Nodes 2 and 3 of the KD-epsilon tree. As another example, the non-buffer storage (remaining storage other than buffer) for Node 2 may include metadata information for Nodes 4 and 5 of the KD-epsilon tree. Moreover, the metadata stored for Node 4 may include metadata information for leaf nodes Nodes 8 and 9 of the KD-epsilon tree. The metadata may include the child pointers embedded in the various parent nodes of the data tree, and therefore, describes the list of children nodes in the data tree.

In this manner, the list of upper nodes of the data tree can be stored on a cache memory for efficient pre-fetching, and the data processing service 102 can traverse the metadata tree to efficiently determine the set of nodes of the data tree that need to be processed for a query operation without paying parent node to child node traversal latency costs. For a read operation for a given range of key-values, the data processing service 102 may first traverse through the metadata tree (which may correspond to one or more parent nodes of the KD-epsilon tree) to determine nodes of the metadata tree that overlap the range of key-values. The traversal of the metadata tree may skip any metadata sub-tree that does not overlap with the range of key-values. Specifically, the data processing service 102 may read only the metadata associated with the identified nodes in the traversed paths of the metadata tree, and skip the remainder of the metadata. The data processing service 102 identifies nodes of the data tree from the selected metadata nodes that overlap with the range of key-values. The data processing service 102 may skip any nodes of the data tree that do not overlap with the range of key-values. The data processing service 102 may then read the identified data files and retrieve records with the desired key-value range. For example, the identified data files may correspond to leaf nodes of the KD-epsilon tree that were not cached in memory, and the data processing service 102 may retrieve the identified data files from cloud object storage to perform the query operation. The data processing service 102 also applies the changes stored in the parent nodes of a leaf node when performing the query. Therefore, the data tree and the metadata tree described herein allows for efficient data skipping for both metadata and data files of a data table, significantly reducing computational burden for read operations.

Returning to the discussion of FIG. 1A, the control layer 106 is additionally capable of configuring the clusters in the data layer 108 that are used for executing the requests. For example, a user of a client device 116 may submit a request to perform one or more query operations and may specify that a number of clusters (e.g., four clusters) on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more operations received from the control layer 106. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. A tenant of the data processing service 102 may be an entity (e.g., business organization, university, individual user) that may be associated with an established account of the data processing service 102. The data processing service 102 may allocate storage to store data for a tenant and/or computing resources to perform one or more processing operations on the data for the tenant. For example, a respective data layer instance can be implemented for each respective tenant. However, it is appreciated that in other embodiments, the data layer 108 can be configured as a single tenant architecture.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data configured on a cloud platform, and may include a commercially provided distributed storage system service. Thus, the data storage system 110 may be managed by the same entity that manages the data processing service 102 or by a separate entity than an entity that manages the data processing service 102. In one embodiment, the data storage system 110 may be included in the data layer 108.

The client devices 116 are computing devices that may provide for display of information to users and communicate user actions to the systems of the system environment 100. While two client devices 116A, 116B are illustrated in FIG. 1, in practice many client devices 116 may communicate with the systems (e.g., data processing service 102) of the system environment 100. In one embodiment, a client device 116 is a conventional computer system, such as a desktop or laptop computer. As another example, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one example embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the systems of the system environment 100 through a web interface or an application programming interface (API) running on a native operating system of the client device 116, such as IOS® or ANDROID™.

Data Storage System

Figure 2:
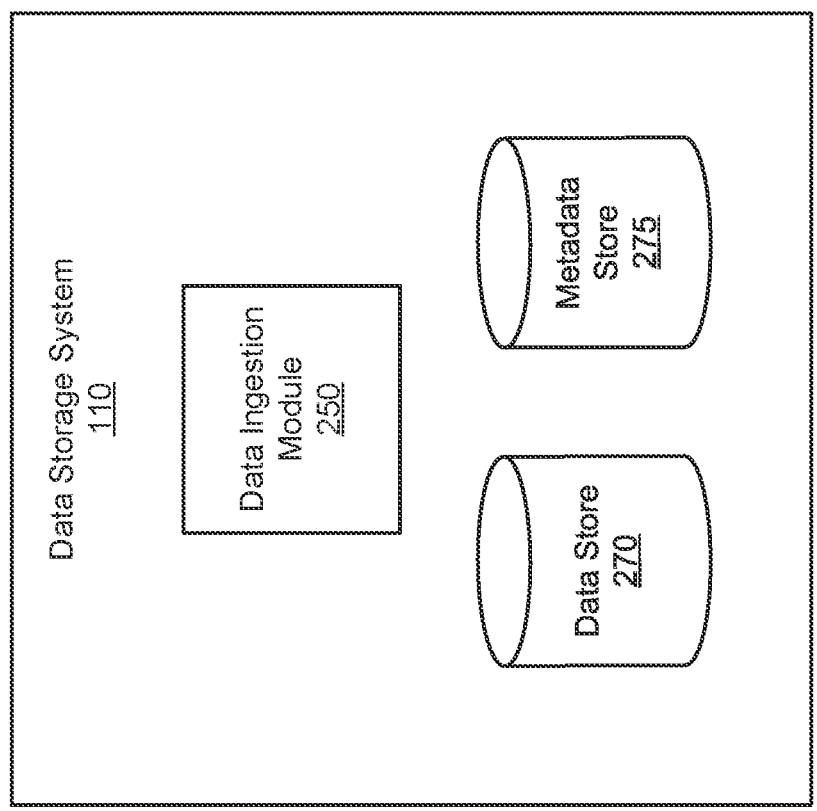
FIG. 2 illustrates a block diagram of an architecture of the data storage system, in accordance with an embodiment.

FIG. 2 illustrates a block diagram of an architecture of the data storage system 110, in accordance with an embodiment.

As illustrated in FIG. 2, the data storage system 110 includes a data ingestion module 250. The data storage system 110 also includes a data store 270 and a metadata store 275. The data ingestion module 250 ingests various forms of data into the data storage system 110, including data from external sources. For example, a tenant may store data across various data sources, such as different databases or product applications, and it may be advantageous to gather the data into the data storage system 110 for further data processing and analytics. In one instance, the data sources are third-party sources, and the data ingestion module 250 may ingest data from these sources using connectors. The data ingestion module 250 may ingest data in discrete batches, or may continuously ingest data as new data becomes available in these sources.

The data store 270 stores data associated with tenants of the data processing service 102. In some embodiments, the data in the data store 270 is stored in a format of a data table. A data table may include a plurality of records or instances, where each record may include values for one or more features. A feature may represent a measurable piece of data that can be used for analysis, such as, login account, timestep, etc. A feature may refer to any characteristic of the data that can be associated with one or more values of various data types, such as discrete or continuous values, string values, and the like. In one embodiment, the records may span across multiple rows of the data table and the features may span across multiple columns of the data table. In other embodiments, the records may span across multiple columns and the features may span across multiple rows. For example, a data table associated with a company may include a plurality of records each corresponding to a login instance of a respective user to a website, where each record includes values for a set of features including user login account, timestamp of attempted login, whether the login was successful, and the like.

As described above, a data table in the data store 270 may be stored in conjunction with a data tree configured as a KD-epsilon tree. Thus, the data files of the data table may be stored in accordance with the data tree. For example, the one or more data files may each be associated with a respective leaf node, and a data file of the data table corresponding to a respective leaf node may include records that align with the splitting conditions of the leaf node and the parent nodes of the leaf node. In one instance, an association between a data file and a node in the data tree is an explicit property in that the data tree may be stored in conjunction with the names or identifiers of the data files associated with the node. In another instance, a data file may be associated with a node in the data tree based on the key-value ranges of the set of keys in the data file. In other words, the data tree may not necessarily be stored with the data files associated with each node, but a data file may be implicitly associated with a node of the data tree because the key-value ranges for the set of keys in the data file match the conditions for a respective node and its parent nodes.

In some embodiments, the metadata store 275 also includes transaction logs for data tables. A transaction log for a respective data table is a log recording a sequence of transactions that were performed on the data table. A transaction may perform one or more changes to the data table that may include removal, modification, and/or addition of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 110, and the commit is indicated in the transaction log for a data table. Since a transaction may remove, update, or add data files to the data table, a particular version of the data table in the transaction log may be defined with respect to the set of data files for the data table. For example, a first transaction may have created a first version of a data table defined by data files A and B each having information for a respective subset of records of the data table. A second transaction may have subsequently created a second version of the data table defined by data files A, B, and new data file C, which include another respective subset of records (e.g., new appended records) of the data table.

Control Layer

Figure 3:
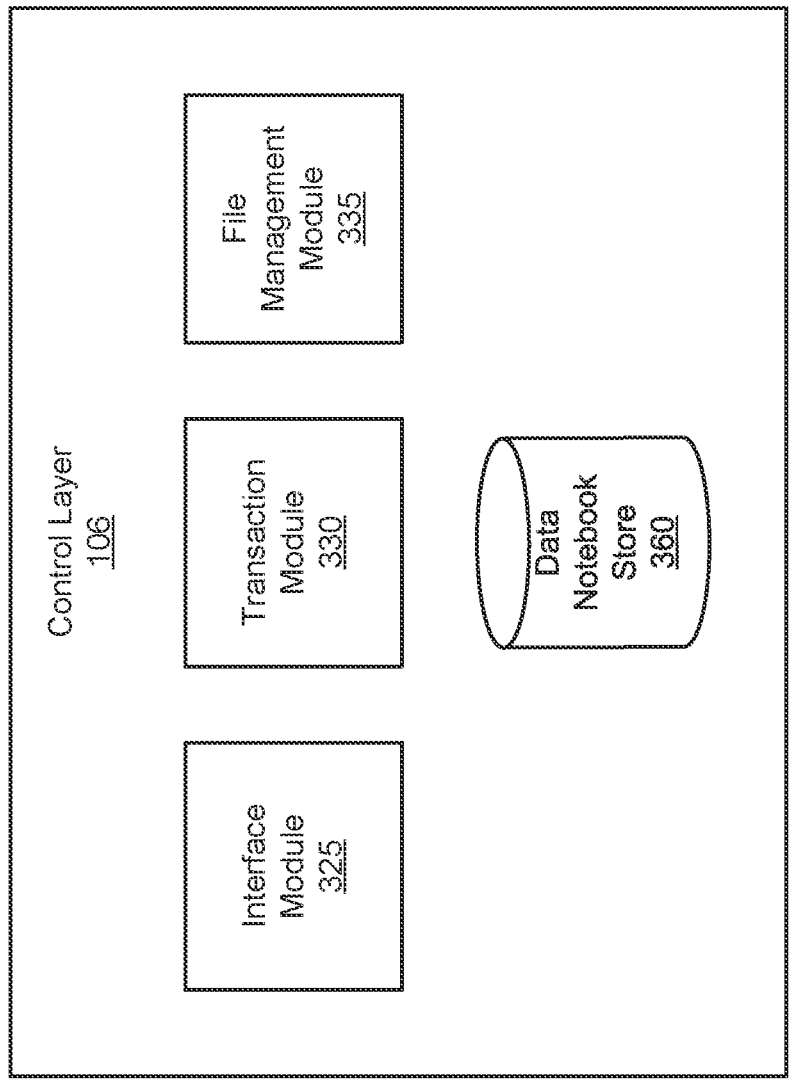
FIG. 3 is a block diagram of an architecture of a control layer, in accordance with an embodiment.

Referring now to FIG. 3, illustrated is a block diagram of an architecture of a control layer 106, in accordance with some example embodiments. As shown, the control layer 106 includes an interface module 325, a transaction module 330, a file management module 335, and a data notebook store 360.

The interface module 325 provides an interface and/or a workspace environment where users of client devices 116 (e.g., users associated with tenants) can access resources of the data processing service 102. For example, the user may retrieve information from data tables associated with a tenant and submit data processing requests, such as query requests on the data tables, through the interface provided by the interface module 325. The interface provided by the interface module 325 may include electronic notebooks, libraries, experiments (e.g., data and/or analysis), and/or queries submitted by the user. In some embodiments, a user may access the workspace via a user interface (UI), a command line interface (CLI), and/or through an application programming interface (API) provided by the interface module 325.

In some embodiments, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The transaction module 330 receives requests to perform one or more transaction operations from users of client devices 116. As described in conjunction in FIG. 1A, a request to perform a transaction operation may represent one or more changes to the data table or one or more read operations to the data table. For example, the transaction may be to insert new records into a data table, replace existing records in the data table, delete records in the data table, and the like. As another example, the transaction may be to rearrange the records or the data files to, for example, improve the speed of operations such as queries on the data table. For instance, when a particular version of a data table has a significant number of data files composing the data table, some operations may be relatively inefficient. Thus, one type of transaction operation may be a compaction operation that combines the records included in one or more data files into a single data file.

In some embodiments, the transaction module 330 receives a request to perform a transaction operation that writes a set of records into a data table. For example, the request may be to add new records or update existing records of the data table. The transaction module 330 may provide instructions to the data layer 108 such that the cluster resources of the data layer 108 retrieves the data files from the data storage system 110 and processes the set of records to perform the transaction operation. When the data table is clustered according to the KD-epsilon tree described herein, the transaction module 330 may provide the request and/or information on the set of records to the file management module 335. The transaction module 330 may also receive instructions on how the records should be written to one or more data files in accordance with the clustering of the data tree and provide the instructions received from the file management module 335 to the data layer 108.

In some embodiments, the transaction module 330 instructs the data layer 108 to execute the request to ingest the set of records by writing the set of records starting from the files that correspond to the root node of the data tree. If the buffer of the root node is exceeded, the data layer 108 may write the remaining records (and/or at least a portion of the records previously stored to the root node) to data files corresponding to the parent nodes that are child nodes of the root node. If the buffer size of the parent nodes that are child nodes of the root node are sufficient, the data layer 108 may write the records to files associated with the parent nodes. Alternatively, if the buffer size of one or more parent nodes are exceeded, this process is repeated for each of the child nodes of the parent nodes to write at least a portion of the records that were pushed from a previous parent node to a data file of a corresponding to the child node. This process is recursively repeated until leaf nodes of the data tree are reached.

The file management module 335 generates KD-epsilon tree structures for one or more data tables stored in the data storage system 110. In some embodiments, the file management module 335 generates a data tree for a data table having a set of keys by recursively dividing the records of the data table according to key-values for each key. For example, the file management module 335 selects a splitting condition with respect to a respective key for the nodes of the second level of the data tree (i.e., child nodes of the root node) such that approximately half (or a threshold proportion or number) of the data of the data table can be split into each child node. For example, the selected conditions may be C1$\Leftarrow$500 and C1>500, as in the example data tree shown in FIG. 1B. The file management module 335 may select another splitting condition with respect to another respective key for the nodes of the third level of the data tree (i.e., child nodes of the intermediate nodes) such that approximately half (or a threshold proportion or number) of the data that belong to each parent node can be further split into each child node. For example, the selected conditions for the parent node Node 2 may be C2$\Leftarrow$3 and C2>3, as in the example data tree shown in FIG. 1B, and so on, until certain nodes have below a threshold proportion of records that are associated with the node.

Similarly, the file management module 335 may also store and manage metadata for the data table by defining one or more parent nodes of the KD-epsilon tree as metadata nodes that is capable of storing metadata for one or more children nodes of the data tree for the data table in addition to storing buffered changes to the data table.

In some embodiments, the file management module 335 receives a request from the transaction module 330 that includes information on a set of records to be written to a data table that is clustered according to a data tree and a metadata tree. The information may include the size of the set of records and the data distribution of the key-values of the set of records. The file management module 335 may initially determine whether a parent node (e.g., root node) in the data tree has sufficient data storage in the buffer to incorporate the set of records. Responsive to determining that the parent node has sufficient data storage, the file management module 335 may instruct the transaction module 330 to write the set of records to the file associated with the parent node.

In instances in which the file management module 335 determines that the parent node has insufficient data storage, the file management module 335 may perform a "spillover" analysis on how the set of records should be ingested into the data table. Specifically, if the transaction operation is executed for a large number of records, most or all of the data files of the data tree may need to be rewritten as spillover can recursively occur for many nodes down the data tree, triggering a domino effect that can slow down the operation significantly. Thus, when the data distribution of the set of records is known to the file management module 335, the file management module 335 may perform the spillover analysis to determine how the set of records should be ingested to prevent a large number of data files from being rewritten during execution of the operation.

In some embodiments, the file management module 335 simulates various ways to limit the number of data files that have to be rewritten for the data table when the buffer for the current parent node is expected to overfill. For example, the file management module 335 may simulate whether the set of records can be immediately pushed down or ingested at lower levels of the data tree rather than to data files of the parent node. In instances when there is insufficient storage at the root node, the file management module 335 may determine that writing the set of records immediately to data files of the leaf nodes is more efficient, especially when the data distribution of the key-values in the set of records is relatively uniform. In such an instance, the file management module 335 may instruct the transaction module 330 to write the set of records immediately to the leaf nodes (or any other set of intermediate nodes), rather than triggering a domino effect of rewriting most or all of the data files of the data tree. In one embodiment, the parent nodes of all leaf nodes that are rewritten are also rewritten, because the buffered changes should spill down into the leaf node at the same time the leaf nodes are rewritten. Else, stale data that remains at high levels in the tree would wrongly override new data that was written immediately to a leaf node. The parent nodes may also store new child pointers to the rewritten files.

In some embodiments, the file management module 335 simulates whether spillover occurs if the set of records or the data at the current parent node is pushed to the data files of the child nodes. If the buffer for at most one child node is exceeded, the file management module 335 repeats the analysis for the overflowed child node until the leaf nodes are reached or there are no more child nodes that overflow. If at each level through the data tree, there is at most one child node that overflows, the file management module 335 instructs the transaction module 330 to proceed with executing the transaction operation. This way, the amount of data that is rewritten is limited to the depth of the data tree. Alternatively, if the buffer for both child nodes are exceeded, the file management module 335 may determine to proceed with the transaction operation if there is sufficient computing resources on the cluster, or the file management module 335 may determine to push only a portion of the set of records from the parent node to the child nodes to prevent the buffer of the child nodes from overflowing.

Figure 4A:
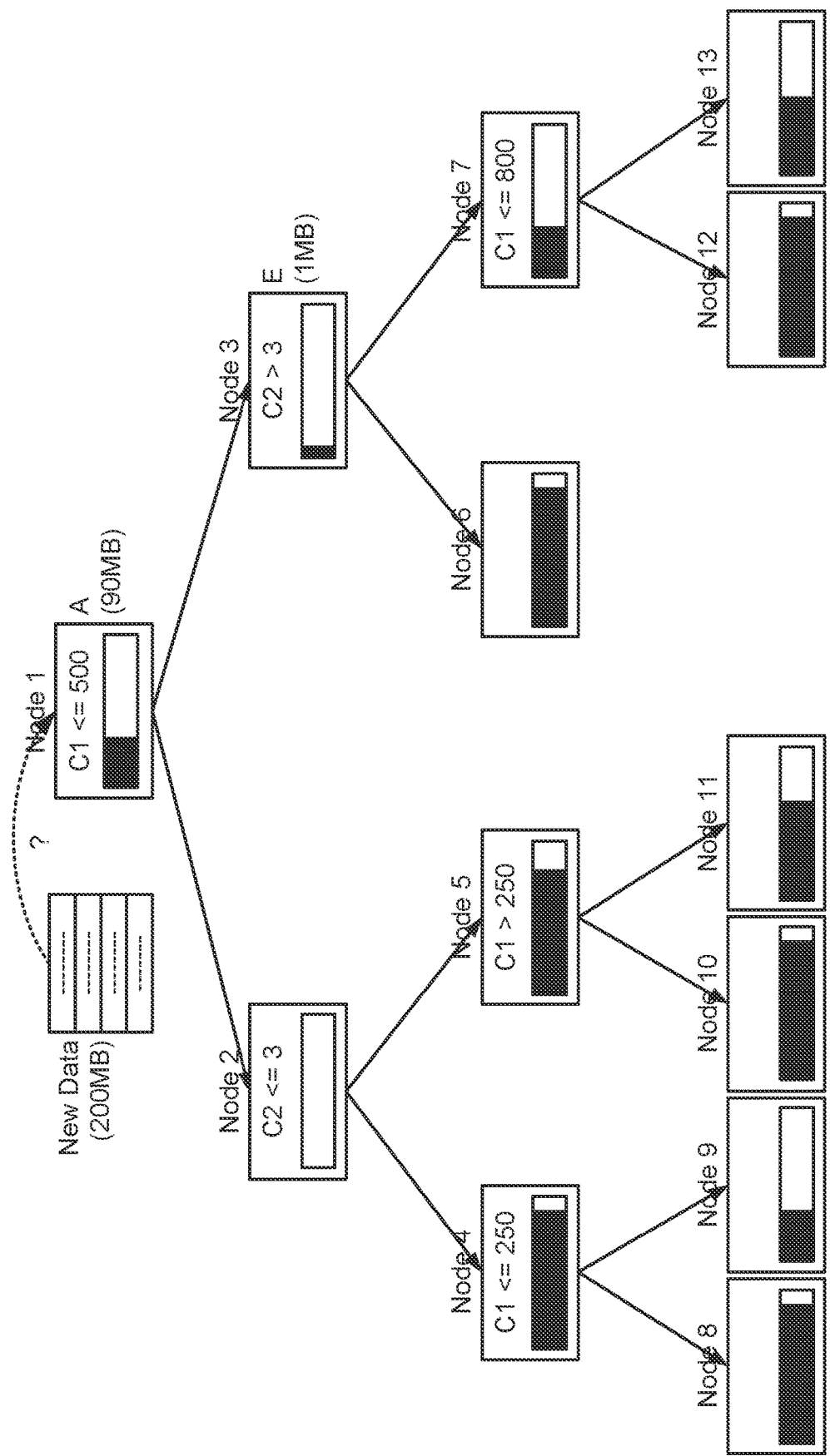
FIGS. 4A-4B illustrates an exemplary method for ingesting new data based on the KD-epsilon tree, in accordance with an embodiment.
Figure 4B:
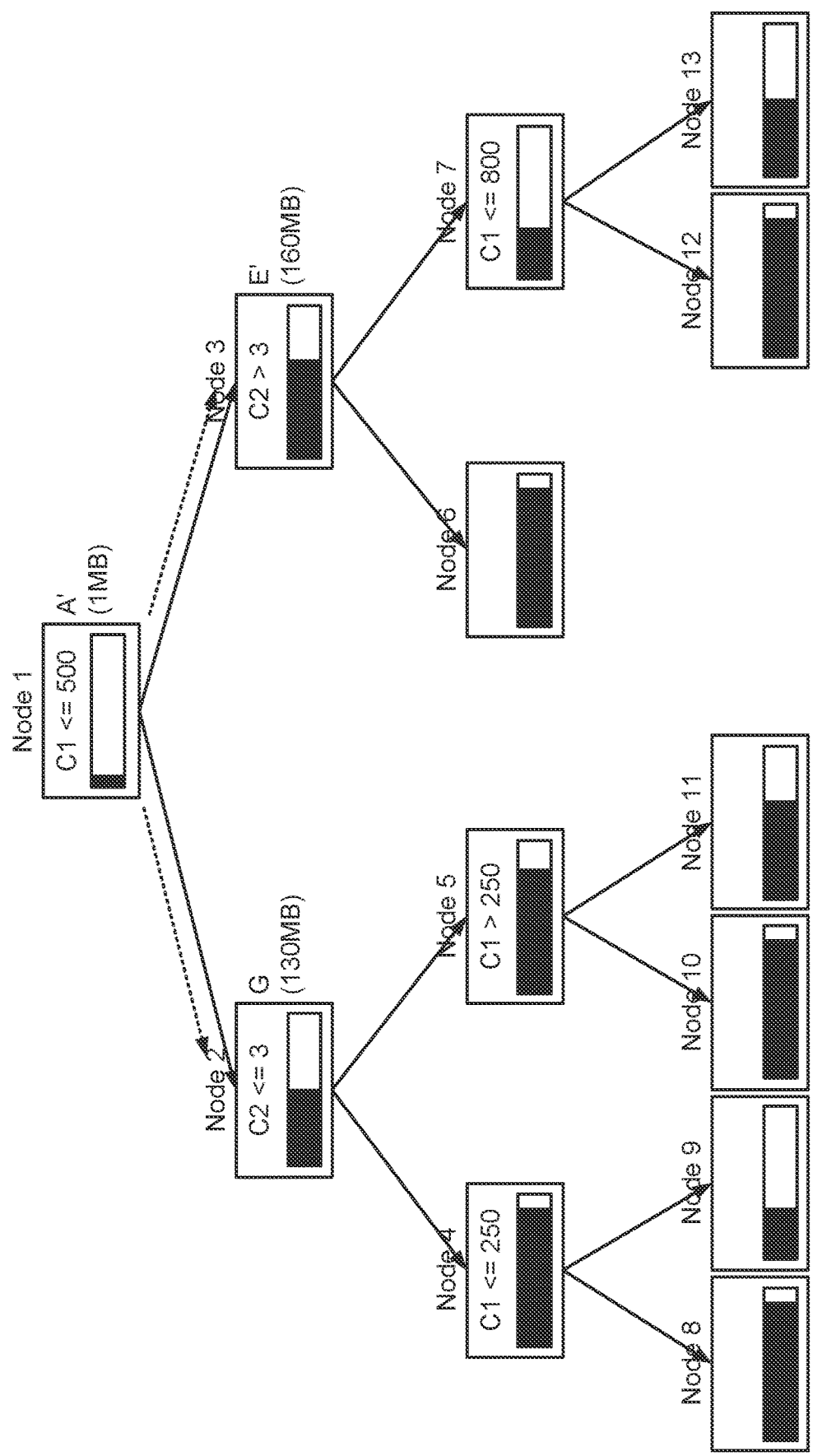

FIGS. 4A-4B illustrates an exemplary method for ingesting data based on the KD-epsilon tree, in accordance with some embodiments. In the example shown in FIG. 4A, the transaction module 330 receives a request to ingest 200 MB of records to a data table. The file management module 335 may determine whether there is sufficient data storage for the root node (Node 1). Since there is 90 MB of existing data in the file for the root node, adding the 200 MB of new data would cause the buffer for the root node to overflow, since 290 MB is greater than 256 MB. In one instance, the file management module 335 performs a spillover analysis and determines whether child nodes Node 2 and Node 3 would overflow if 290 MB of data in the root node were pushed down. In the example shown in FIG. 4B, based on the simulation, the file management module 335 determines that Node 2 would now have 130 MB of records and Node 3 would have 160 MB of records, and both child nodes would not overflow. Accordingly, the file management module 335 may instruct the transaction module 330 to proceed with the transaction operation. After the transaction operation has been executed, the data file A previously associated with the root node are updated to data file A' that includes 1 MB of data, the data file for Node 2 are updated to new data file G, and the data file for Node 3 is updated to updated data file E'. As another example, the file management module 335 may also determine to immediately write the 200 MB of records to leaf nodes of the data tree responsive to determining that there is sufficient buffer at each leaf node to store the records with the relevant key-values.

In one embodiment, the transaction module 330 may also maintain a temporary data storage or buffer in conjunction with a KD-epsilon tree. For example, if the data table receives a significant number of changes, such as a significant number of records, deletions, or updates, and these records are expected to change frequently in the near future, this may cause write amplification throughout the levels of the KD-epsilon tree if the buffers starting from the root node overfill. Thus, in such an embodiment, the clusters in the data layer 108 may first store such changes in the temporary data storage, and merge new changes as they are received. The data layer 108 may then store the changes to records to the buffer in the root node or any other parent node in the KD-epsilon tree such that the root buffer does not easily spillover.

In some instances, the set of records to be ingested into the data table may be so large that spillover occurs even at the leaf nodes. In these instances, the file management module 335 may determine that the leaf node of the data tree should be further split into a set of child nodes that each have respective conditions for the set of keys. For example, responsive to determining that for a set of records, the buffers for nodes through the path Node 1, Node 3, Node 7, and Node 13 would all overflow, the file management module 335 may determine that Node 13 should be further split into child nodes that each have respective conditions $C2 \Leftarrow 4.5$ and $C2 > 4.5$ that further create smaller bounding boxes for clustering the data. The file management module 335 may instruct the transaction module 330 to write the records that align with these conditions to new data files for these child nodes.

While the KD-epsilon tree may be also constructed with respect to a single key, this may result in a data tree that is disproportionately deeper for certain traversal paths. For example, when the key-value is a timestamp, the bulk of newly ingested records may have timestamps that are more recent, and therefore, may the nodes of the data tree that are associated with more-recent timestamp values would be more likely to overspill. This may cause the leaf nodes along these paths to further split, and so on, such that the data tree is disproportionately deeper along these nodes compared to other paths of the data tree. By splitting the data through two or more keys, the data tree (and the corresponding metadata tree) can be further grown in a relatively balanced way than a data tree split with a single key. While B+ trees may help maintain balance for highly skewed insertion patterns, B+ trees are able to track a single dimension. Thus, by using the KD-epsilon tree described herein, the clustering may occur across multiple dimensions while balancing skewed insertion patterns at the same time.

Ingesting Records to a Data Table Using Data Tree and Metadata Tree

Figure 5:
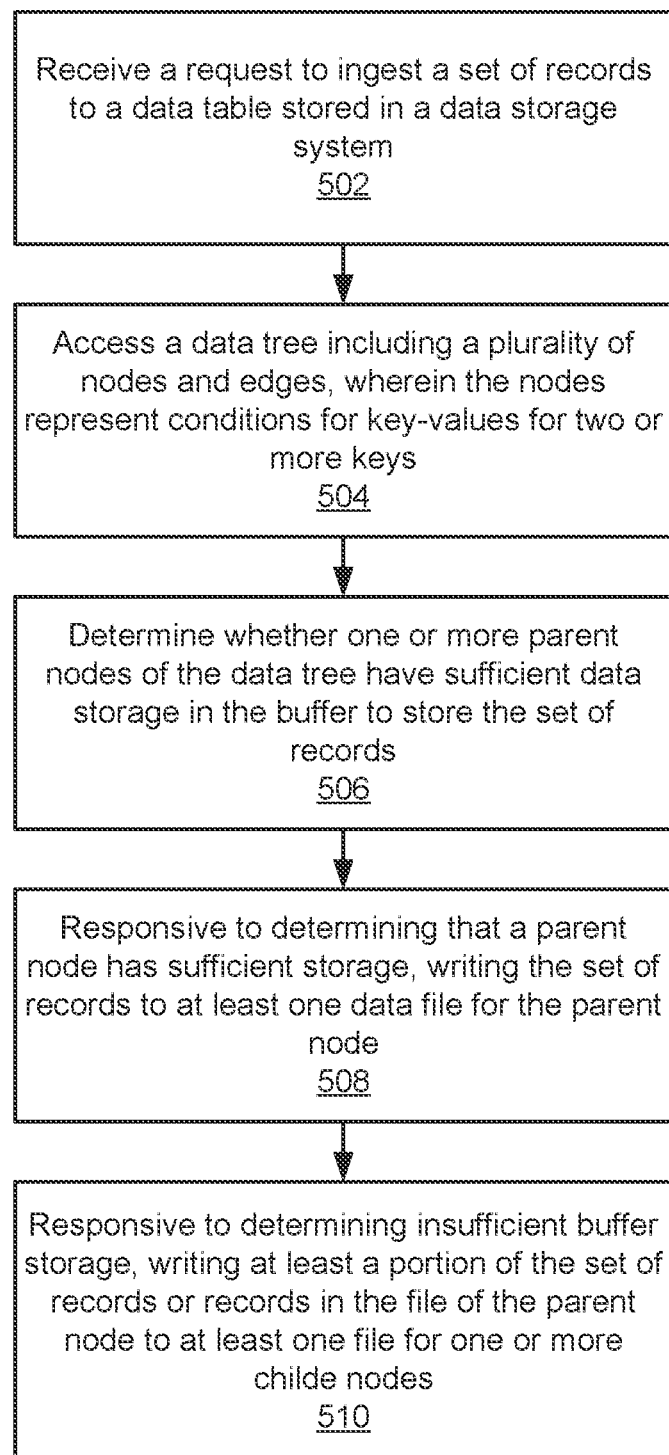
FIG. 5 is a flowchart of a method for ingesting a set of records into a data table clustered using a KD-epsilon tree, in accordance with an embodiment.

FIG. 5 is a flowchart of a method for ingesting a set of records into a data table clustered using a KD-epsilon tree, in accordance with an embodiment. The process shown in FIG. 5 may be performed by one or more components (e.g., the control layer 106 or the file management module 335) of a data processing system/service (e.g., the data processing service 102). Other entities may perform some or all of the steps in FIG. 5. The data processing service 102 as well as the other entities may include some or of the component of the machine (e.g., computer system) described in conjunction with FIG. 7. Embodiments may include different and/or additional steps, or perform the steps in different orders.

The data processing service 102 receives 502, from a client device, a request to ingest a set of records to a data table stored in a data storage system. The data table may include includes a plurality of records for one or more features. The data processing service 102 accesses 504 a data tree for the data table including a plurality of nodes and edges. The nodes of the data tree may represent conditions with respect to key-values for two or more keys. Each node may be associated with one or more data files that each include a subset of records having key-values satisfying the condition for the node and conditions associated with parent nodes of the node. The node may be associated with a buffer that indicates an amount of data storage dedicated to the node. The data processing service 102 determines 506 whether one or more parent nodes of the data tree have sufficient data storage in the buffer to store the set of records of the request. Responsive to determining that a parent node has sufficient data storage, the data processing service 102 writes 508 the set of records to at least one data file associated with the parent node. Responsive to determining that there is insufficient buffer storage, the data processing service 102 writes 510 at least a portion of the set of records or records in the one or more data files associated with the parent node to at least one data file associated with one or more child nodes of the parent node.

Data Skipping Using KD-Epsilon Tree

Figure 6:
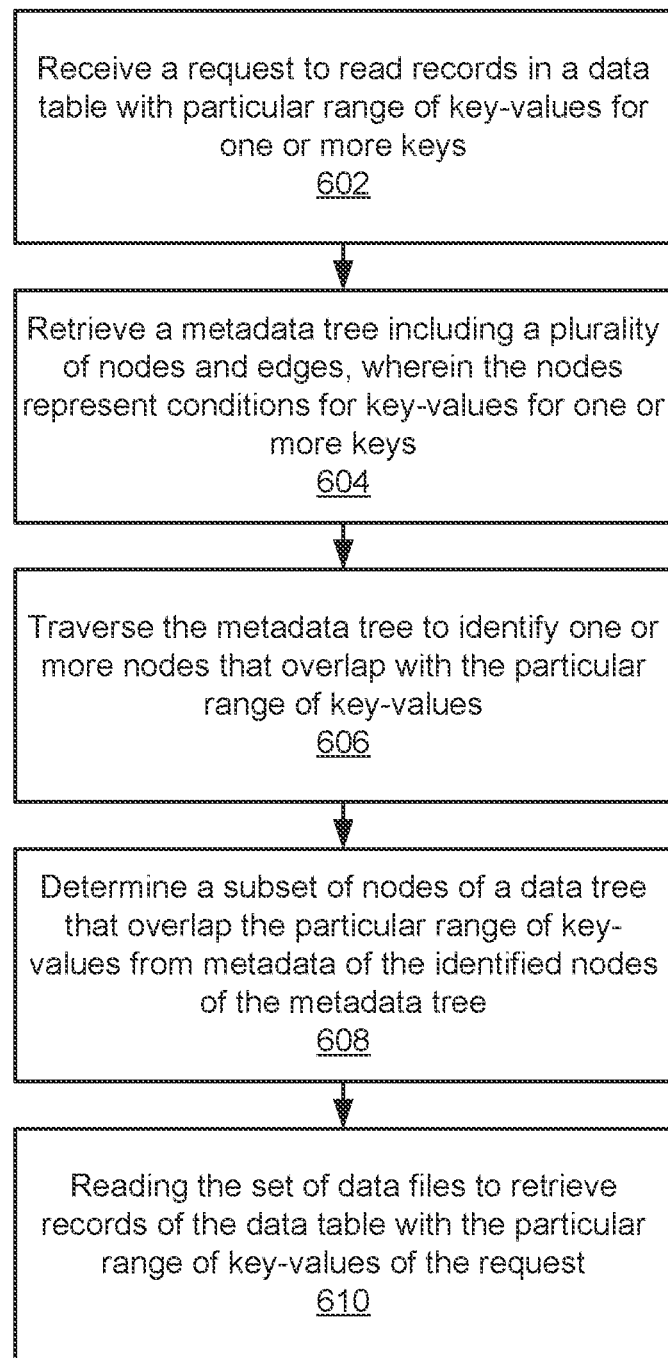
FIG. 6 is a flowchart of a method for data skipping using a KD-epsilon tree and a metadata tree, in accordance with an embodiment.

FIG. 6 is a flowchart of a method for data skipping using a KD-epsilon tree and a metadata tree, in accordance with an embodiment. The process shown in FIG. 6 may be performed by one or more components (e.g., the control layer 106 or the file management module 335) of a data processing system/service (e.g., the data processing service 102). Other entities may perform some or all of the steps in FIG. 6. The data processing service 102 as well as the other entities may include some or of the component of the machine (e.g., computer system) described in conjunction with FIG. 7. Embodiments may include different and/or additional steps, or perform the steps in different orders.

The data processing service 102 receives 602, from a client device, a request to read records in a data table with a particular range of key-values for one or more keys. The data table may include a plurality of records for one or more features. The data processing service 102 retrieves 604 a metadata tree for the data table including a plurality of nodes and edges to memory. The nodes of the metadata tree may represent conditions with respect to key-values for the one or more keys. Each node may store at least metadata for one or more data files having key-values satisfying the condition for the node and conditions associated with parent nodes of the node in the metadata tree. The data processing service 102 traverses 606 the metadata tree to identify one or more nodes of the metadata tree that overlap with the particular range of key-values. From the metadata of the identified nodes of the metadata tree, the data processing service 102 determines 608 a subset of nodes of the data tree that overlap the particular range of key-values and the data files associated with the subset of nodes. The data processing service 102 reads 610 the set of data files associated with the subset of nodes of the data tree to retrieve records of the data table with the particular range of key-values of the request.

Figure 7:
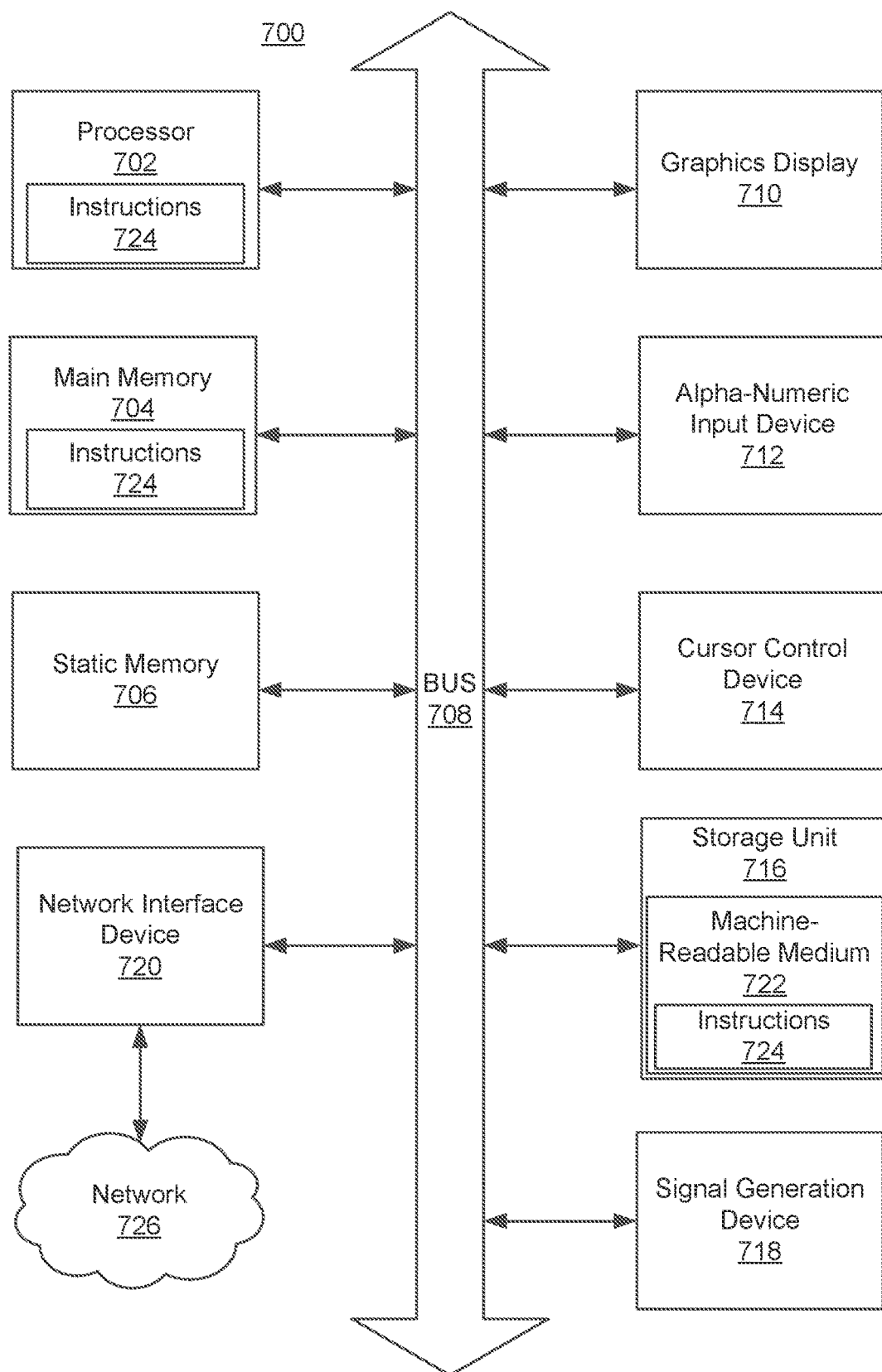
FIG. 7 is a block diagram illustrating an example machine to read and execute computer readable instructions, in accordance with an embodiment.

Turning now to FIG. 7, illustrated is an example machine to read and execute computer readable instructions, in accordance with an embodiment. Specifically, FIG. 7 shows a diagrammatic representation of the data processing service 102 (and/or data processing system) in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the transaction module 330 and/or the file management module 335. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially provide a method (and/or a system) for resolving concurrent transactions using deletion vectors. Without deletion vectors, concurrent transactions may fail to commit due to the conflicts introduced by intervening transactions, and the current transaction typically will have to start over from the most current version of the data table, resulting in wasted computing resources and time. By resolving concurrent conflicts in conjunction with deletion vectors associated with data files, the method presented herein may determine the serializability of the concurrent transactions and prevent many transaction operations from failing and having to be started over again, saving resources and cost for both the data processing service and the users of the data processing service.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method comprising:
receiving, from a client device, a request to read records in a data table with a particular range of key-values for one or more keys, the data table including a plurality of records for one or more features;
retrieving a metadata tree for the data table including a plurality of nodes and edges into memory, the nodes of the metadata tree representing conditions with respect to key-values for two or more keys, each node corresponding to a respective parent node in a data tree and storing at least metadata on one or more files that are children nodes of the node in the data tree;

traversing the nodes of the metadata tree to identify one or more nodes with conditions that overlap with the particular range of key-values for the one or more keys;

reading the metadata for the identified one or more nodes of the metadata tree to determine a set of data files specified in the metadata with key-values that overlap with the particular key-value range; and reading the set of data files to retrieve records of the data table with the particular range of key-values of the request.

2. The method of claim 1, the data tree stored in cloud object storage and the data tree including a second plurality of nodes and edges, each node in the data tree representing conditions with respect to key-values for the two or more keys.

3. The method of claim 1, the metadata on the one or more files including at least one or a combination of names of the data files, min-max statistics of the data files, and size of the data files.

4. The method of claim 1, wherein during the reading of the metadata for the identified one or more nodes, a read operation of at least one node of the metadata tree that does not overlap with the particular range of key-values is skipped.

5. The method of claim 4, wherein during the reading of the set of data files, a read operation of at least one data file associated with at least one node of the data tree that does not overlap with the particular range of key-values is skipped.

6. The method of claim 1, each node of the metadata tree associated with a buffer that indicates an amount of metadata storage dedicated to the node.

7. The method of claim 1, wherein the set of data files read correspond to a set of leaf nodes of the data tree.

8. A non-transitory computer-readable storage medium comprising stored instructions executable by one or more processors, the instructions when executed causing the one or more processors to:

receive, from a client device, a request to read records in a data table with a particular range of key-values for one or more keys, the data table including a plurality of records for one or more features;

retrieve a metadata tree for the data table including a plurality of nodes and edges into memory, the nodes of the metadata tree representing conditions with respect to key-values for two or more keys, each node corresponding to a respective parent node in a data tree and storing at least metadata on one or more files that are children nodes of the node in the data tree;

traverse the nodes of the metadata tree to identify one or more nodes with conditions that overlap with the particular range of key-values for the one or more keys;

read the metadata for the identified one or more nodes of the metadata tree to determine a set of data files specified in the metadata with key-values that overlap with the particular key-value range; and read the set of data files to retrieve records of the data table with the particular range of key-values of the request.

9. The non-transitory computer-readable medium of claim 8, the data tree stored in cloud object storage and the data tree including a second plurality of nodes and edges, each node in the data tree representing conditions with respect to key-values for the two or more keys.

10. The non-transitory computer-readable medium of claim 8, the metadata on the one or more files including at least one or a combination of names of the data files, min-max statistics of the data files, and size of the data files.

11. The non-transitory computer-readable medium of claim 8, further comprises stored instructions that when executed cause the one or more processors to skip a read operation of at least one node of the metadata tree that does not overlap with the particular range of key-values.

12. The non-transitory computer-readable medium of claim 11, further comprises stored instructions that when executed cause the one or more processors to skip a read operation of at least one data file associated with at least one node of the data tree that does not overlap with the particular range of key-values.

13. The non-transitory computer-readable medium of claim 8, each node of the metadata tree associated with a buffer that indicates an amount of metadata storage dedicated to the node.

14. The non-transitory computer-readable medium of claim 8, wherein the set of data files read correspond to a set of leaf nodes of the data tree.

15. A computer system, comprising:

a computer processor; and a memory comprising stored instructions that when executed by the computer processor causes the computer system to:

receive, from a client device, a request to read records in a data table with a particular range of key-values for one or more keys, the data table including a plurality of records for one or more features;

retrieve a metadata tree for the data table including a plurality of nodes and edges into memory, the nodes of the metadata tree representing conditions with respect to key-values for two or more keys, each node corresponding to a respective parent node in a data tree and storing at least metadata on one or more files that are children nodes of the node in the data tree;

traverse the nodes of the metadata tree to identify one or more nodes with conditions that overlap with the particular range of key-values for the one or more keys;

read the metadata for the identified one or more nodes of the metadata tree to determine a set of data files specified in the metadata with key-values that overlap with the particular key-value range; and read the set of data files to retrieve records of the data table with the particular range of key-values of the request.

16. The computer system of claim 15, the data tree stored in cloud object storage and the data tree including a second plurality of nodes and edges, each node in the data tree representing conditions with respect to key-values for the two or more keys.

17. The computer system of claim 15, the metadata on the one or more files including at least one or a combination of names of the data files, min-max statistics of the data files, and size of the data files.

18. The computer system of claim 15, wherein the memory further comprises instructions that when executed cause the computer system to skip a read operation of at least one node of the metadata tree that does not overlap with the particular range of key-values.

19. The computer system of claim 18, wherein the memory further comprises instructions that when executed cause the computer system to skip a read operation of at least one data file associated with at least one node of the data tree that does not overlap with the particular range of key-values.

20. The computer system of claim 15, wherein the set of data files read correspond to a set of leaf nodes of the data tree.

\* \* \* \* \*

UNITED STATES PATENT AND TRADEMARK OFFICE
CERTIFICATE OF CORRECTION

| | | |
|---|---|---|
| PATENT NO. | : 12,332,862 B2 | Page 1 of 1 |
| APPLICATION NO. | : 18/218766 | |
| DATED | : June 17, 2025 | |
| INVENTOR(S) | : Jain et al. | |

It is certified that error appears in the above-identified patent and that said Letters Patent is hereby corrected as shown below:

On the Title Page

Item (54), in Column 1, in "Title", Line 1, delete "DATA" and insert -- READ OPERATIONS USING DATA --, therefor.

In the Specification

In Column 1, Line 1, delete "DATA" and insert -- READ OPERATIONS USING DATA --, therefor.

Signed and Sealed this
Second Day of September, 2025

Coke Morgan Stewart
*Acting Director of the United States Patent and Trademark Office*